US012692800B2

(12) United States Patent
Sanzari

(10) Patent No.: US 12,692,800 B2
(45) Date of Patent: Jul. 28, 2026

(54) SLEEVE FOR SERIALLY-ARRANGED SEAL ELEMENTS

(71) Applicant: Pratt & Whitney Canada Corp., Longueuil (CA)

(72) Inventor: Lorenzo Sanzari, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 51 days.

(21) Appl. No.: 18/644,705

(22) Filed: Apr. 24, 2024

(65) Prior Publication Data

US 2025/0334058 A1 Oct. 30, 2025

(51) Int. Cl.
*F01D 25/16* (2006.01)
*F01D 25/18* (2006.01)

(52) U.S. Cl.
CPC ........... *F01D 25/183* (2013.01); *F01D 25/16* (2013.01); *F05D 2240/54* (2013.01); *F05D 2240/55* (2013.01); *F05D 2300/224* (2013.01)

(58) Field of Classification Search
CPC .... F01D 25/183; F01D 25/16; F05D 2240/54; F05D 2240/55; F05D 2300/224
See application file for complete search history.

(56) References Cited

U.S. PATENT DOCUMENTS

| | | | |
|---|---|---|---|
| 5,301,957 | A | 4/1994 | Hwang et al. |
| 6,789,803 | B2 | 9/2004 | Radosav |
| 7,175,388 | B2 | 2/2007 | Labbe et al. |
| 7,905,495 | B2 | 3/2011 | Munson |
| 9,631,508 | B2 | 4/2017 | Blais et al. |
| 11,549,444 | B2 | 1/2023 | Beinor et al. |
| 2020/0040754 | A1 | 2/2020 | Labbe et al. |
| 2021/0355836 | A1 | 11/2021 | Miller |

FOREIGN PATENT DOCUMENTS

| | | |
|---|---|---|
| EP | 3722568 B1 | 6/2023 |

OTHER PUBLICATIONS

Extended European Search Report for EP Application No. 25172423.3, dated Oct. 13, 2025, pp. 1-8.

*Primary Examiner* — Aaron R Eastman
(74) *Attorney, Agent, or Firm* — CANTOR COLBURN LLP

(57) ABSTRACT

A seal arrangement of a gas turbine engine includes two seal assemblies arranged in a serial relationship relative to an engine central longitudinal axis. Each seal assembly includes a seal carrier, and a primary seal element positioned in the seal carrier and configured to seal to a rotating component of the gas turbine engine abutting the primary seal element. A seal sleeve is positioned radially outboard of the seal carriers of the two seal assemblies. The seal sleeve is configured to retain the two seal assemblies in position abutting the rotating component.

20 Claims, 2 Drawing Sheets

SLEEVE FOR SERIALLY-ARRANGED SEAL ELEMENTS

BACKGROUND

Exemplary embodiments pertain to the art of turbomachinery such as gas turbine engines. In particular, the present disclosure relates to bearing assemblies and sealing of bearing assemblies of gas turbine engines.

Turbomachines, such as gas turbine engines typically include one or more bearing assemblies to radially and/or axially support the rotating components of the turbomachine. The bearing assemblies typically include carbon seals to prevent the air and oil mixture, which lubricates the main bearings, from escaping and maintains the pressure within the cavity.

Carbon seals have the capability of creating tight seals between rotating and stationary parts of the engine when compared to other seals such as lab seals. These seals have favorable properties, including high wear resistance, self-lubricating characteristics, and the ability to withstand high temperatures and harsh operating conditions.

The design of carbon seal assemblies consists of carbon rings supported and aligned by spring mechanisms and housed within a metallic case. Designing carbon seal assemblies can be both costly and challenging. P&WC doesn't undertake the design and production of these assemblies; instead, they procure them from suppliers.

Single carbon seal assemblies and double carbon seal assemblies are used in different applications based on factors such as operating conditions, performance requirements, and cost considerations.

Single carbon seal assemblies (ie. metallic housing containing one carbon ring) are typically used in low to moderate pressure applications, when rotational speeds are relatively low, where there are space constraints, and cost constraints.

Double carbon seal assemblies (ie. metallic housing containing two carbon rings) are typically used in high pressure applications, when rotational speeds are high, when enhanced sealing is required and when the operating environment is harsh. They are also more costly than single carbon seals.

BRIEF DESCRIPTION

In one exemplary embodiment, a seal arrangement of a gas turbine engine includes two seal assemblies arranged in a serial relationship relative to an engine central longitudinal axis. Each seal assembly includes a seal carrier, and a primary seal element positioned in the seal carrier and configured to seal to a rotating component of the gas turbine engine abutting the primary seal element. A seal sleeve is positioned radially outboard of the seal carriers of the two seal assemblies. The seal sleeve is configured to retain the two seal assemblies in position abutting the rotating component.

Additionally or alternatively, in this or other embodiments the two seal assemblies are two identical seal assemblies.

Additionally or alternatively, in this or other embodiments the primary seal element is a carbon seal element.

Additionally or alternatively, in this or other embodiments the seal sleeve includes one or more airflow openings to direct an airflow toward the two seal assemblies to pressurize the two seal assemblies.

Additionally or alternatively, in this or other embodiments the seal sleeve includes a sleeve base defining a first axial end of the seal sleeve and configured to axially retain the two seal assemblies, and a sleeve arm extending axially from the sleeve base and positioned radially between the two seal assemblies and a rotationally fixed structure of the gas turbine engine.

Additionally or alternatively, in this or other embodiments a sleeve removal feature is positioned at the sleeve base to aid in removal of the seal sleeve.

Additionally or alternatively, in this or other embodiments a first seal assembly of the two seal assemblies is positioned at a first orientation, and a second seal assembly of the two seal assemblies is positioned at a second orientation opposite the first orientation.

In another exemplary embodiment, a bearing arrangement of a gas turbine engine includes a bearing housing, and a bearing assembly positioned in the bearing housing. The bearing assembly includes a bearing inner race, a bearing outer race positioned radially outwardly from the bearing inner race, and one or more bearing elements located radially between the bearing inner race and the bearing outer race. A seal arrangement is position in the bearing housing and includes two seal assemblies arranged in a serial relationship relative to an engine central longitudinal axis. Each seal assembly includes a seal carrier, and a primary seal element positioned in the seal carrier and configured to seal to a rotating component of the gas turbine engine abutting the primary seal element. A seal sleeve is positioned radially outboard of the seal carriers of the two seal assemblies. The seal sleeve is configured to retain the two seal assemblies in position abutting the rotating component.

Additionally or alternatively, in this or other embodiments the two seal assemblies are two identical seal assemblies.

Additionally or alternatively, in this or other embodiments the primary seal element is a carbon seal element.

Additionally or alternatively, in this or other embodiments the seal sleeve includes one or more airflow openings to direct an airflow toward the two seal assemblies to pressurize the two seal assemblies.

Additionally or alternatively, in this or other embodiments the seal sleeve includes a sleeve base defining a first axial end of the seal sleeve and configured to axially retain the two seal assemblies, and a sleeve arm extending axially from the sleeve base and positioned radially between the two seal assemblies and a rotationally fixed structure of the gas turbine engine.

Additionally or alternatively, in this or other embodiments a sleeve removal feature is positioned at the sleeve base to aid in removal of the seal sleeve.

Additionally or alternatively, in this or other embodiments a first seal assembly of the two seal assemblies is positioned at a first orientation, and a second seal assembly of the two seal assemblies is positioned at a second orientation opposite the first orientation.

In another exemplary embodiment, a gas turbine engine includes one or more rotating shafts, one or more turbines operably connected to the one or more rotating shafts, and one or more bearing arrangements. Each bearing arrangement is supportive of a shaft of the one or more rotating shafts. A bearing arrangement of the one or more bearing arrangements includes a bearing housing, and a bearing assembly positioned in the bearing housing. The bearing assembly includes a bearing inner race, a bearing outer race positioned radially outwardly from the bearing inner race, and one or more bearing elements located radially between the bearing inner race and the bearing outer race. A seal arrangement is positioned in the bearing housing and includes two seal assemblies arranged in a serial relationship relative to an engine central longitudinal axis. Each seal assembly includes a seal carrier and a primary seal element positioned in the seal carrier and configured to seal to a rotating component of the gas turbine engine abutting the primary seal element. A seal sleeve is positioned radially outboard of the seal carriers of the two seal assemblies. The seal sleeve is configured to retain the two seal assemblies in position abutting the rotating component.

Additionally or alternatively, in this or other embodiments the two seal assemblies are two identical seal assemblies.

Additionally or alternatively, in this or other embodiments the primary seal element is a carbon seal element.

Additionally or alternatively, in this or other embodiments the seal sleeve includes one or more airflow openings to direct an airflow toward the two seal assemblies to pressurize the two seal assemblies.

Additionally or alternatively, in this or other embodiments the seal sleeve includes a sleeve base defining a first axial end of the seal sleeve and configured to axially retain the two seal assemblies, and a sleeve arm extending axially from the sleeve base and positioned radially between the two seal assemblies and a rotationally fixed structure of the gas turbine engine.

Additionally or alternatively, in this or other embodiments a first seal assembly of the two seal assemblies is positioned at a first orientation, and a second seal assembly of the two seal assemblies is positioned at a second orientation opposite the first orientation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
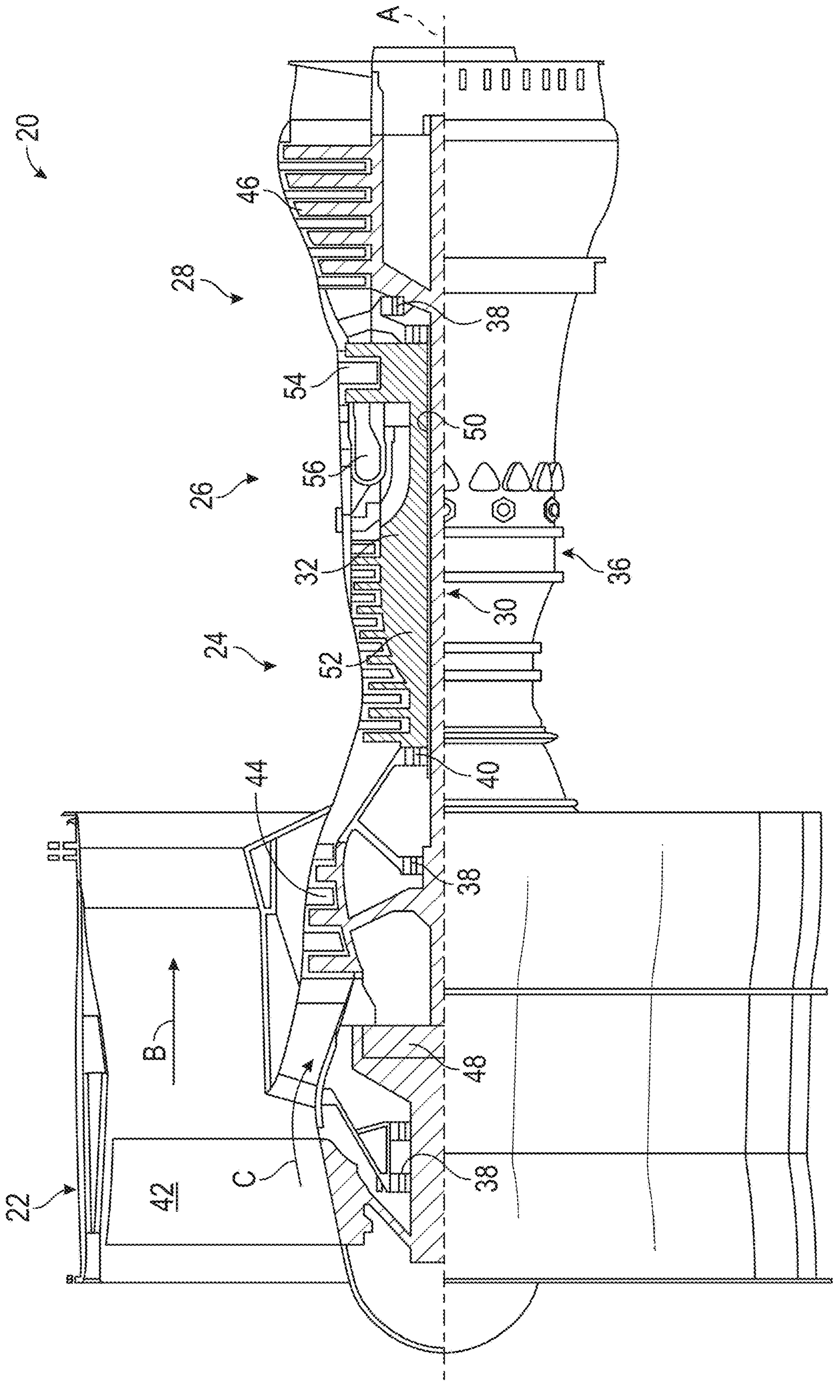
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
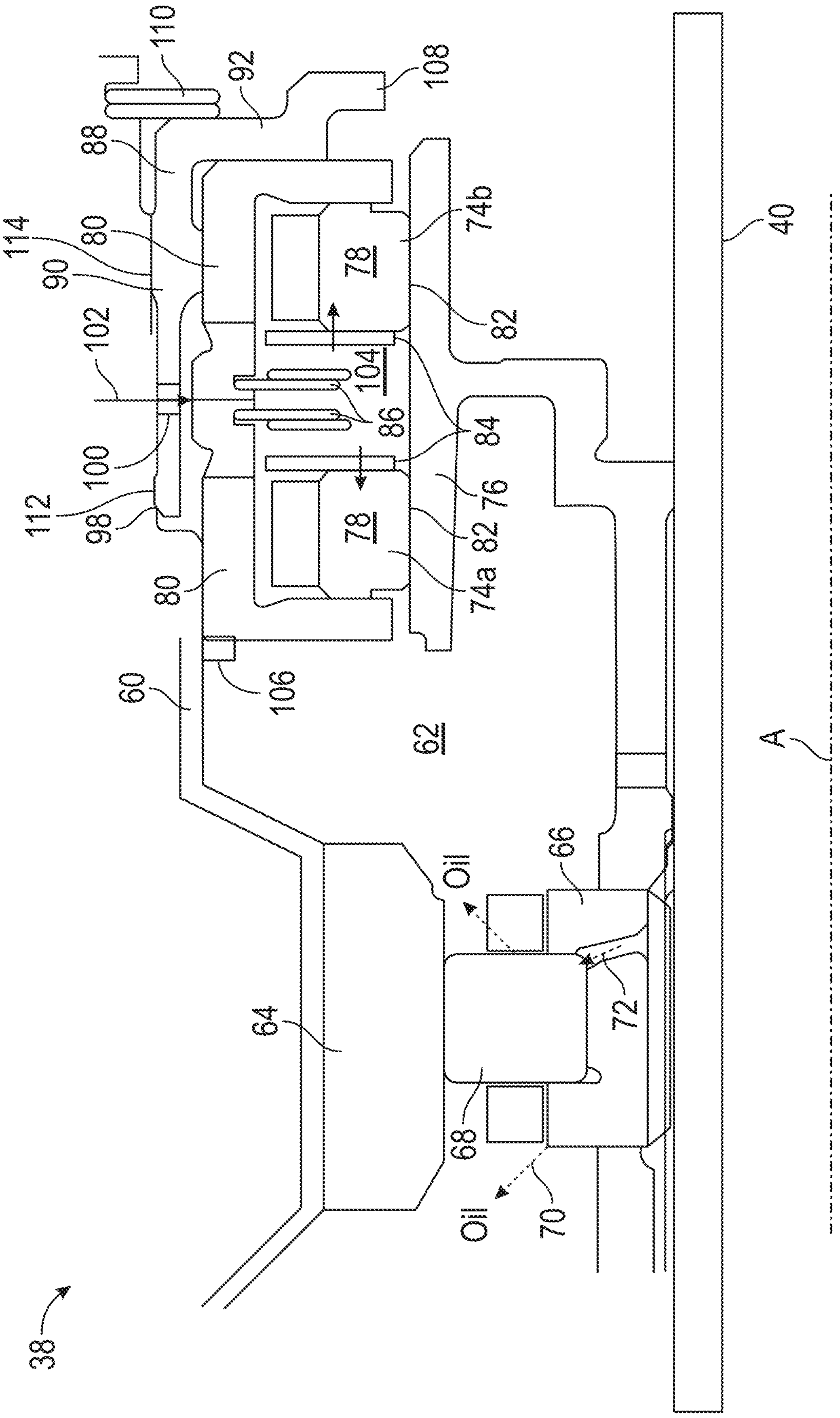
FIG. 2 is a partial cross-sectional view of an embodiment of a bearing and bearing seal of a gas turbine engine.

Referring now to FIG. 2, illustrated is an exemplary embodiment of a bearing 38. The exemplary bearing 38 may be located at, for example, the inner shaft 40 or the outer shaft 50. In the following description, the shaft is an inner shaft 40, but one skilled in the art will readily appreciate that this is merely exemplary, and that the shaft may be an outer shaft 50 or any other shaft or rotating component.

The bearing 38 is located in a bearing housing 60 located at a radially outer extent of the bearing 38, with components of the bearing 38 being disposed inside of the housing 60, which defines a bearing cavity 62. In some embodiments, the bearing 38 includes a bearing outer race 64 and a bearing inner race 66, with one or more bearing elements 68 located radially between the bearing outer race 64 and the bearing inner race 66. The bearing 38 is lubricated via a flow of lubricant 70, such as oil, directed through one or more oil ports 72 toward surfaces of components of the bearing 38.

To prevent leakage of lubricant 70 and air out of the bearing cavity 62, bearing seals assemblies 74, also referred to herein as 74*a* and 74*b*, are utilized. The bearing seals assemblies 74 are positioned between the rotationally fixed bearing housing 60 and a seal runner 76 that is installed to and rotates with the shaft 40. While a separate seal runner 76 is utilized in the embodiment of FIG. 2, in other embodiments the seal runner 76 may be integral to the shaft 40 and/or may be defined on a surface of the shaft 40.

The bearing seal assembly 74 includes a primary seal 78, which in some embodiments is a carbon seal element, positioned in a seal carrier 80 such that a sealing surface 82 of the primary seal 78 abuts, and in some embodiments contacts, the seal runner 76 to define a seal interface to prevent the flow of lubricant 70 and air from exiting the bearing cavity 62. The bearing seal assembly 74 may further include a retaining spring 84 installed in the seal carrier 80 to urge the primary seal 78 axially against the seal carrier 80. The primary seal 78 is retained in the seal carrier 80 in an axial direction by a seal retainer 86. The bearing seal assembly 74 may include one or more biasing elements, not shown, to bias a position of the primary seal 78 radially toward the seal runner 76.

In the embodiment of FIG. 2, two identical bearing seal assemblies 74 are positioned at the seal runner 76 in an axially serial relationship. In some embodiments, a first bearing seal assembly 74*a* is in a first orientation, and a second bearing seal assembly 74*b* is in a second orientation opposite the first orientation. The first bearing seal assembly 74*a* and the second bearing seal assembly 74*b* are arranged in a seal sleeve 88. The seal sleeve 88 includes an axially-extending sleeve arm 90 located radially between the bearing housing 60 and the seal carrier 80, and a sleeve base 92 extending radially from the sleeve arm 90 and defining a first axial end of the seal sleeve 88. A second axial end of the seal sleeve 88 is defined by an arm tip 98 of the sleeve arm 90. The seal sleeve 88 retains the identical bearing seal assemblies 74 between the bearing housing 60 and the seal runner 76. The seal sleeve 88 is installed in the bearing housing 60 and includes radial sealing features 112 and 114 that about the bearing housing 60 providing a tight fit between the bearing housing 60 and the seal sleeve 88.

The seal sleeve 88 includes at least one airflow opening 100 in the sleeve arm 90. The airflow opening 100 admits an airflow 102 through the seal sleeve 88 toward the bearing seal assemblies 74. The airflow 102 pressurizes a seal compartment 104 between the seal sleeve 88 and the seal runner 76, thus urging the first bearing seal assembly 74*a* in a first axial direction toward, for example, a housing stop 106 of the bearing housing 60, and also urge the second bearing seal assembly 74*b* in a second axial direction opposite the first axial direction toward the sleeve base 92. In some embodiments, the airflow opening 100 is located axially between the first bearing seal assembly 74*a* and the second bearing seal assembly 74*b*. The radial sealing features 112 and 114 of the seal sleeve 88 prevent leakage of the airflow 102 and ensure that the airflow 102 is directed through the airflow opening 100. The resulting pressure in the seal compartment 104 is greater than the pressure in the bearing cavity 62 thus preventing lubricant 70 from escaping the bearing cavity 62 via the seal assemblies 74.

It is to be appreciated, however, that this positioning of the airflow opening 100 is merely exemplary and that the airflow opening 100 may be positioned at other axial locations along the sleeve arm 90.

In some embodiments, the seal sleeve 88 includes a removal feature, such as a removal flange 108 extending from the sleeve base 92. The removal flange 108 is easily accessible to aid in removing the seal sleeve 88 via a removal tool, not illustrated. Once the seal sleeve 88 is removed, the second bearing seal assembly 74*b* may be removed, followed by removal of the first bearing seal assembly 74*a*, for servicing of the bearing seal assemblies 74*a*, 74*b*. To install the bearing seal assemblies 74*a*, 74*b*, first the first bearing seal assembly 74*a* is installed to the seal runner 76. Then the second bearing seal assembly 74*b* may be installed together with the seal sleeve 88. In other embodiments, the second bearing seal assembly 74*b* and the seal sleeve 88 are installed separately. Once the seal sleeve 88 is installed, one or more sleeve retainers, such as retaining rings 110 are installed to the bearing housing 60 to secure the seal sleeve 88 in place and to prevent inadvertent removal of the seal sleeve 88.

Use of the seal sleeve 88 facilitates the use of a dual carbon seal configuration having two identical bearing seal assemblies 74*a*, 74*b*. This allows the use of single carbon seal assemblies from other engine products thus reducing the number of unique carbon seal assemblies used across engine products. The airflow openings allow for adjustable regulation of the airflow to achieve optimal pressures and sealing conditions. Further, arranging the two carbon seal assemblies in series eliminates the need to procure and utilize carbon seal assemblies with two carbon elements, which can incur considerable expense.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal arrangement of a gas turbine engine, comprising:
two seal assemblies arranged in a serial relationship relative to an engine central longitudinal axis, each seal assembly including:
a seal carrier; and
a primary seal element disposed radially inboard of the seal carrier and configured to seal to a rotating component of the gas turbine engine abutting the primary seal element; and
a seal sleeve disposed radially outboard of the seal carriers of the two seal assemblies, the seal sleeve configured to retain the two seal assemblies in position abutting the rotating component.

2. The seal arrangement of claim 1, wherein the two seal assemblies are two identical seal assemblies.

3. The seal arrangement of claim 1, wherein the primary seal element is a carbon seal element.

4. The seal arrangement of claim 1, wherein the seal sleeve includes one or more airflow openings to direct an airflow toward the two seal assemblies to pressurize the two seal assemblies.

5. The seal arrangement of claim 1, wherein the seal sleeve includes:
a sleeve base defining a first axial end of the seal sleeve, and configured to axially retain the two seal assemblies; and
a sleeve arm extending axially from the sleeve base and disposed radially between the two seal assemblies and a rotationally fixed structure of the gas turbine engine.

6. The seal arrangement of claim 5, further comprising a sleeve removal feature disposed at the sleeve base to aid in removal of the seal sleeve.

7. The seal arrangement of claim 1, wherein a first seal assembly of the two seal assemblies is disposed at a first orientation, and a second seal assembly of the two seal assemblies is disposed at a second orientation opposite the first orientation.

8. A bearing arrangement of a gas turbine engine, comprising:
a bearing housing;
a bearing assembly disposed in the bearing housing, including:
a bearing inner race;
a bearing outer race disposed radially outwardly from the bearing inner race; and
one or more bearing elements located radially between the bearing inner race and the bearing outer race; and
a seal arrangement disposed in the bearing housing, including:
two seal assemblies arranged in a serial relationship relative to an engine central longitudinal axis, each seal assembly including:
a seal carrier; and
a primary seal element disposed radially inboard of the seal carrier and configured to seal to a rotating component of the gas turbine engine abutting the primary seal element; and
a seal sleeve disposed radially outboard of the seal carriers of the two seal assemblies, the seal sleeve configured to retain the two seal assemblies in position abutting the rotating component.

9. The bearing arrangement of claim 8, wherein the two seal assemblies are two identical seal assemblies.

10. The bearing arrangement of claim 8, wherein the primary seal element is a carbon seal element.

11. The bearing arrangement of claim 8, wherein the seal sleeve includes one or more airflow openings to direct an airflow toward the two seal assemblies to pressurize the two seal assemblies.

12. The bearing arrangement of claim 8, wherein the seal sleeve includes:
a sleeve base defining a first axial end of the seal sleeve, and configured to axially retain the two seal assemblies; and
a sleeve arm extending axially from the sleeve base and disposed radially between the two seal assemblies and a rotationally fixed structure of the gas turbine engine.

13. The bearing arrangement of claim 12, further comprising a sleeve removal feature disposed at the sleeve base to aid in removal of the seal sleeve.

14. The bearing arrangement of claim 8, wherein a first seal assembly of the two seal assemblies is disposed at a first orientation, and a second seal assembly of the two seal assemblies is disposed at a second orientation opposite the first orientation.

15. A gas turbine engine, comprising:
one or more rotating shafts;
one or more turbines operably connected to the one or more rotating shafts;
one or more bearing arrangements, each bearing arrangement supportive of a shaft of the one or more rotating shafts, a bearing arrangement of the one or more bearing arrangements, including:
a bearing housing;
a bearing assembly disposed in the bearing housing, including:
a bearing inner race;
a bearing outer race disposed radially outwardly from the bearing inner race; and
one or more bearing elements located radially between the bearing inner race and the bearing outer race; and
a seal arrangement disposed in the bearing housing, including:
two seal assemblies arranged in a serial relationship relative to an engine central longitudinal axis, each seal assembly including:
a seal carrier; and
a primary seal element disposed radially inboard of the seal carrier and configured to seal to a rotating component of the gas turbine engine abutting the primary seal element; and
a seal sleeve disposed radially outboard of the seal carriers of the two seal assemblies, the seal sleeve configured to retain the two seal assemblies in position abutting the rotating component.

16. The gas turbine engine of claim 15, wherein the two seal assemblies are two identical seal assemblies.

17. The gas turbine engine of claim 15, wherein the primary seal element is a carbon seal element.

18. The gas turbine engine of claim 15, wherein the seal sleeve includes one or more airflow openings to direct an airflow toward the two seal assemblies to pressurize the two seal assemblies.

19. The gas turbine engine of claim 15, wherein the seal sleeve includes:
a sleeve base defining a first axial end of the seal sleeve, and configured to axially retain the two seal assemblies; and
a sleeve arm extending axially from the sleeve base and disposed radially between the two seal assemblies and a rotationally fixed structure of the gas turbine engine.

20. The gas turbine engine of claim 15, wherein a first seal assembly of the two seal assemblies is disposed at a first orientation, and a second seal assembly of the two seal assemblies is disposed at a second orientation opposite the first orientation.

* * * * *